United States Patent [19]

Hideharu

[11] Patent Number: 5,007,528
[45] Date of Patent: Apr. 16, 1991

[54] BELT CONVEYOR SUPPORTING ARRANGEMENT

[75] Inventor: Nagahama Hideharu, Hyogo, Japan

[73] Assignee: Yoko Co., Ltd., Hyogo, Japan

[21] Appl. No.: 361,365

[22] Filed: Jun. 5, 1989

[30] Foreign Application Priority Data

Jun. 5, 1988 [JP] Japan ............................ 63-074917[U]

[51] Int. Cl.⁵ ............................................. B65G 15/08
[52] U.S. Cl. ..................................... 198/823; 198/841; 198/826
[58] Field of Search ............... 198/823, 820, 825, 828, 198/826, 830, 836, 841

[56] References Cited

U.S. PATENT DOCUMENTS

| 3,381,799 | 5/1968 | Havelka | 198/823 |
| 4,024,949 | 5/1977 | Kleysteuber et al. | 198/830 X |
| 4,215,776 | 8/1980 | Esler | 198/841 X |
| 4,410,082 | 10/1983 | McGinnis | 198/818 |
| 4,793,470 | 12/1988 | Andersson | 198/823 |

FOREIGN PATENT DOCUMENTS

| 0134505 | 3/1979 | Fed. Rep. of Germany | 198/836 |
| 809670 | 3/1937 | France | 198/841 |
| 42-10992 | 6/1967 | Japan . | |
| 52-69789 | 5/1977 | Japan . | |
| 53-487 | 1/1978 | Japan . | |
| 59-26412 | 2/1984 | Japan . | |
| 60-137711 | 9/1985 | Japan . | |
| 61-165911 | 10/1986 | Japan . | |
| 0123708 | 5/1988 | Japan | 198/836 |
| 63-190106 | 12/1988 | Japan . | |
| 280078 | 1/1952 | Switzerland | 198/836 |
| 0546523 | 3/1977 | U.S.S.R. | 198/841 |
| 0967894 | 10/1982 | U.S.S.R. | 198/836 |

OTHER PUBLICATIONS

*Automation*, Sep. 1967 pp. 71-73.

*Primary Examiner*—D. Glenn Dayoan

[57] ABSTRACT

A belt conveyor supporting arrangement includes three main components for preventing the belt from being damaged. The first component is a backing bed apparatus comprising a smooth slidable top plate having plural air flow channels at the surface thereof which is supported by a cushion plate. The second component is a skirt plate device for shutting the opening between the surface of the belt and the chute with little contact friction. The third component is a bending tension return-roller apparatus M3 comprising a pair of rollers inclined like the symbol [ /\ ] and having a device for adjusting the angles thereof.

9 Claims, 7 Drawing Sheets

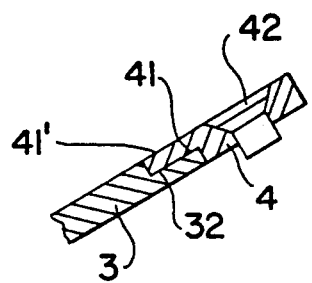
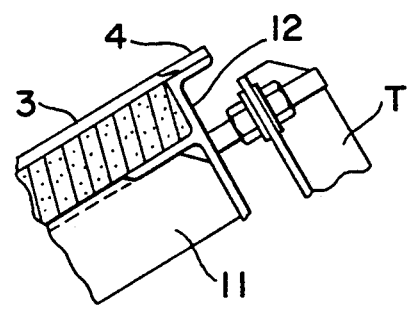
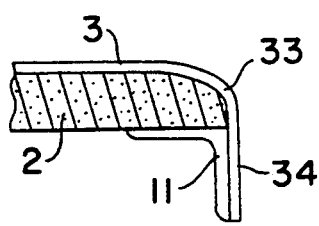
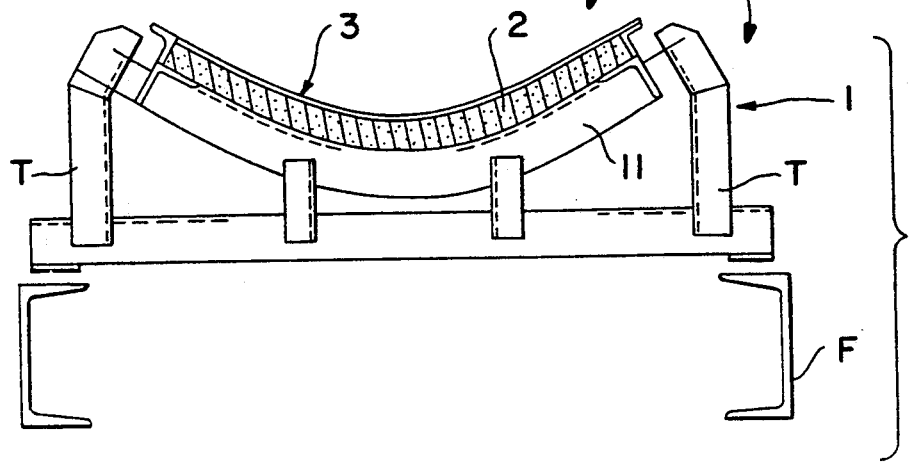

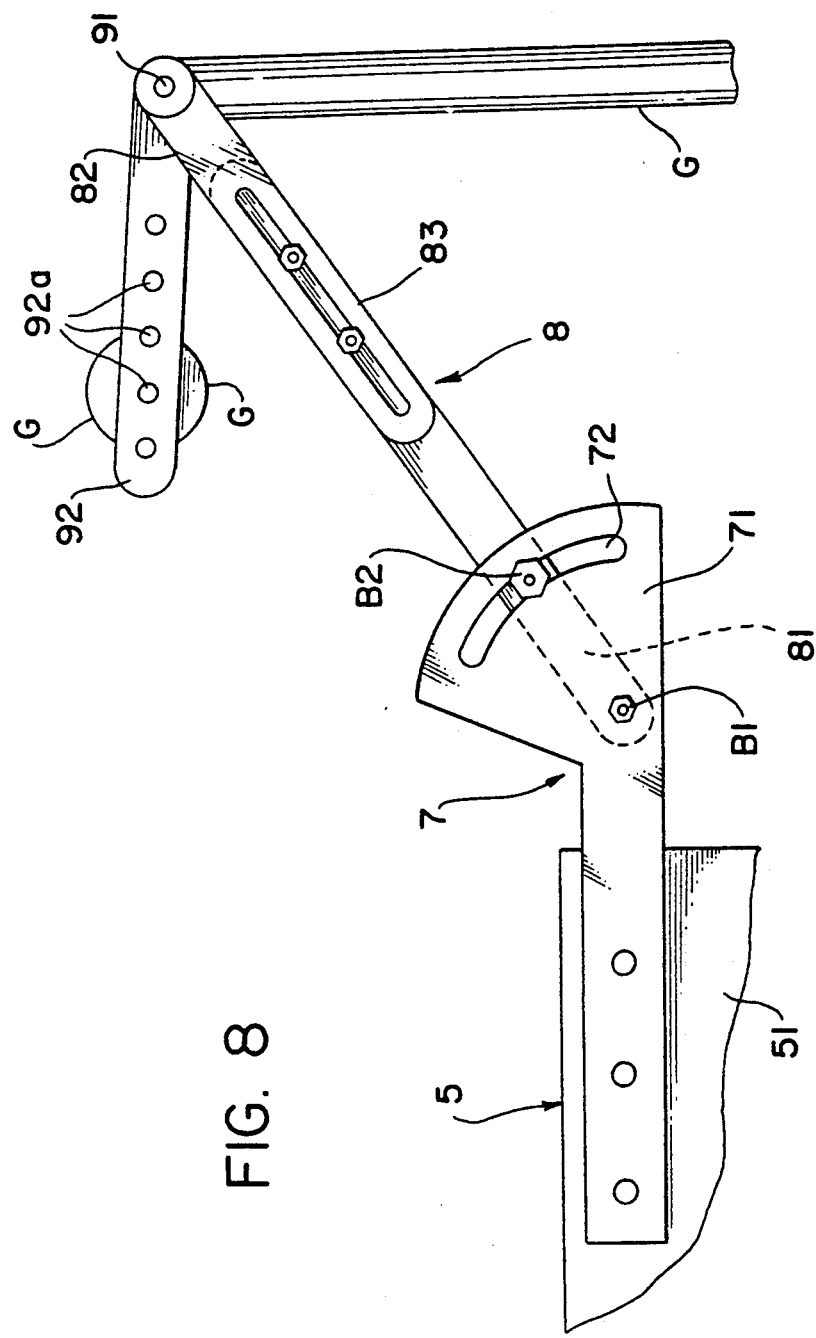

BELT CONVEYOR SUPPORTING ARRANGEMENT

This invention relates to a supporting arrangement for a belt conveyor which is used to convey bulk materials, such as ore, stone, coal, etc.; especially to one which is arranged at a position where bulk materials are transferred to a driven belt from a chute or feeder.

BACKGROUND OF THE INVENTION

When bulk materials such as ore, coal and stone are transferred from a chute or feeder to a belt conveyor, the belt tends to be damaged. Therefore, the chute or feeder is developed so as to lower the dropping energy onto the conveyor belt. For instance, a ladder or stone box L is mounted on the inside of the chute as shown in FIG. 11 so that the drop distance of bulk materials becomes shorter. Alternatively, the chute is usually designed with a throat portion and a pair of plates SC as the bulk materials tend to jump off the belt and lodge between carrier roller C and the belt B as shown in FIG. 12, in which R is a return roller.

The portion of the belt positioned where bulk materials are transferred from the chute is supported by plural carrier rollers C, spaced from each other, so that the dropping materials jump about on the belt and engage between the belt and the rollers C. In this manner, the belt tends to be damaged. Therefore, as shown in FIG. 13, it is proposed that the carrier roller is covered by rubber materials, the rollers are supported by rubber liners RL and also a carrier table T is supported by coil springs or an air cushion device SP. However, such remodeling is unwieldy and such a roller supporting system fails to alleviate dropping impact between the carrier rollers.

To avoid such problems, a proposed supporting arrangement for a belt conveyor comprises a top plate P, made of high molecular polyethylene, which comes into contact with a running belt and an elastic plate R, made of natural or synthetic rubber, through which the top plate P is mounted on a supporting frame so as to support the conveyor belt B on a lubricous surface of the top plate and absorb the dropping impact by the elastic plate P (Japanese Utility Model KOUKAI 137711/1985 and 190106/1988).

In such cases, however, there are some problems such that the top resin plate P becomes badly worn in a short time because it comes into constant surface contact with the running belt and thus the friction area is larger than that in a conventional roller supporting system, so that the resin plate tends to soften and wear out owing to friction heat. Furthermore, it is difficult to bend a resin plate having sufficient rigidity and thickness into the arc troughed shape, which is necessary to convey the bulk materials without excessive jumping on the belt surface. Therefore, as shown in FIG. 14, the resin plate is divided into at least 3 parts so that the belt enters into the opening D between the inclined support plates and the horizontal support plate and thus is worn away or cut down. In the worst cases, the supporting system itself is damaged. Besides, the dropping impact can be lessened only to a limited extent with the elastic plate, so that the dropping materials still tend to jump or flow out through the opening between the chute S and the belt B, causing sanitation problems. It is proposed, therefore, that the opening must be closed by a rubber skirt plate, but it is inevitable that the plates and belt are cut down and wear unevenly because the bulk materials such as ores enter into the small opening between the skirt and belt (which widens with abrasion).

Additionally, the bulk materials drop down from the chute onto the running belt at random, so that material cannot be loaded uniformly onto the receiving surface of the belt and thus the belt tends to run zigzag. Such zigzag running causes the belt to be worn locally. To avoid this problem, attempts have been made to adjust the tension of the endless belt by tension pulleys, but is is difficult to avoid zigzag running.

OBJECT OF THE INVENTION

Accordingly, it is a primary object of the invention to provide an improved rollerless supporting arrangement for prolonging belt-life, and especially for improving the durability of a lubricous backing top plate as well as the belt.

Another objective of the invention is to provide a skirt shutting device, without damaging the belt, for avoiding outflow of dust or fine particles of bulk materials, in the proposed system.

A further objective of the present invention is to provide a return tension roller apparatus for avoiding zigzag running of the belt at the side for receiving bulk materials in the proposed system.

SUMMARY OF THE INVENTION

To accomplish the above objectives, it was found that, providing a top lubricous plate with plural channels extending in the running direction of a belt at the plate surface, which is in contact with the belt, (1) the contact area with the belt is diminished and thus the heat of friction can be decreased between the belt and the top plate, and (2) simultaneously an air flow in the running direction of the belt occurs in the plural channels owing to the running of the belts, and thus, cools the top plate in contact with the belt, so that the top plate can be maintained in good condition for a long time. Also, we have found that it is easy to bend the top stiff plate into the desired arc troughed shape owing to the plural channels on the surface thereof, without any joint spaces, as shown in FIG. 14.

On the basis of the above knowledge, this invention can be completed.

In accordance with this invention, there is provided a belt conveyor supporting arrangement positioned where bulk materials are transferred from a chute or feeder comprised of a supporting frame, a cushioning device mounted on the supporting frame for relieving dropping impact owing to bulk materials dropped onto a conveyor belt and the contact backing top plate which surface is lubricous for smoothly supporting the conveyor belt; the improvement comprising the contact backing top plate's contact surface being provided with plural parallel channels extending in the running direction of the belt arranged to diminish a contact area between the belt and the top plate and generate an air flow in the channels along the running direction of the belt.

In a preferred configuration, the supporting frame has an arc sectional shape in a cross direction of the belt and can be attached on a conventional stand for rollers.

The cushioning device can be formed to have a dropping impact lowering function and is preferably made of a rubber plate mounted in an arc shape along the arc surface of the supporting frame. In this case, the rubber plate tends to hang down to some extent between spaced frame members of the supporting frame owing to receiving repeat impact thereon. Therefore, it is preferred that the spaced frame members are covered at the upper side by a mesh plate in order to prevent the rubber plate from hanging down, thereby maintaining the cushioning function thereof.

As a backing plate, a slotted resin plate can be used. As shown in FIG. 10, long bar members 35 may be inserted and mounted into the slotted channels 31 to be detached in a longitudinal direction therefrom when desired but not to be detached upwardly therefrom by accident. The long bar members have a rectangular cross section and are made of lubricous heat-resist material so that the upper surfaces of the bar members serve as a contact backing surface to the belt. In such a preferred case, the bar members can be replaced with new ones after abrasion, this is beneficial to lower the product cost of the backing plate if they are made of high cost resin materials.

The contact backing plate may be preferably made of a synthetic resin plate having a superior heat resistance, such as teflon resin, ultra molecular polyethylene resin (brand name: ULMOLAR made by TAKIRON Co., Ltd. in Japan), heat resisting nylon resin (brand name: MC-NYLON made by NIHON POLYPENKO Co., Ltd.). MC-NYLON is best among them for the backing material. Such materials in a plate having a desired thickness are difficult to bend into an arc shape having a desired curvature.

According to this invention, the backing plate is provided at the upper surface with plural parallel channels in a cross direction thereof, so that it is easy to bend the plate into an arc shape in such a direction and thus mount it on the rubber plate along the arc surface thereof.

For achieving the second object in the above supporting arrangement comprised of a supporting frame; a cushioning device on the frame; a contact backing top plate on the device, there is a provided a skirt plate device M2 for shutting the opening between the belt conveyor and the chute, comprised of a pair of plates made of lubricous resin material which are extending in a running direction of the belt and positioned in a spaced relation at both sides of the belt and are supported upstream of the belt by a pivoted means so as to automatically descend by its own weight and contact the belt surface with little friction.

In a preferred embodiment, as with the lubricous resin materials for production of the skirt plate, the use of high molecular polyethylene resin, teflon resin or heat resisting nylon resin mentioned above, especially heat resisting nylon resin, for example MC-NYLON, is recommended.

In such a device, the skirt plate tends to lower by its own weight so that no gap occurs between the plate and belt even as the lower part thereof wears. It is preferred, however, to adjust a weight of the skirt plate by arranging a balance-weight G, thereon, so as to prevent the skirt plate from jumping on the belt.

For achieving the third objective in the above supporting arrangement comprised of a supporting frame, a cushioning device mounted on the frame, and a contact backing top plate on the device, a bending tension roller apparatus comprised at least of a pair of rollers inclined in the opposite direction just like the symbol [/\] are provided. The two rollers are linked with each other pivotably at one end axis thereof and at the other end axis thereof are connected to the supporting table by means of a slidable connector, whereby the angle between the opposite inclined rollers can be adjusted to such a desired extent that the belt can be prevented from zigzag running.

In such an apparatus, it is preferred that a pair of the inclined rollers is connected pivotably with a center connecting roller at both end axes thereof.

The above first arrangement M1, of this invention, includes a top contact plate provided with plural parallel channels at the surface thereof, thereby the surface area contact with the running belt is decreased and the air flow occurring in the channels cools the surface of the contact plate. Additionally, the channels on the upper surface thereof permit the plate to be deformable into an arc troughed shape although it is made of a stiff material.

Further, the above second arrangement M2, of this invention, provides an automatically lowering lubricous skirt plate for shutting the opening above the belt, thereby bulk materials tend not to flow out from the belt surface and no cutting or local wearing problems caused by the entering of ores between the belt and the skirt plate occur.

Furthermore, according to the above third arrangement M3, of this invention, a pair of the inclined rollers permits the belt at the return side to be forced into a desired arc troughed shape, so that no problem of abrasion caused by zigzag running of the belt owing to random loading occurs.

According to this invention, the belt for conveying bulk materials can be completely prevented from damage by the combination of the above three arrangements M1, M2 and M3, and the service life of the conveyor belt can be greatly extended.

Many other features, advantages, and additional objects of the present invention will become apparent to those skilled in the art upon making reference to the detailed description which follows and the accompanying sheet of drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus, are not limitative of the present invention, and wherein:

BRIEF DESCRIPTION OF THE DRAWINGS

FIG. 2 is a sectional view taken on line II—II

FIG. 6(a) is an enlarged fragmentary end vertical section showing a side end of FIG. 2;

FIG. 6(b) is an enlarged fragmentary end vertical section showing a front end of FIG. 3;

FIG. 7 is an enlarged fragmentary vertical section of the top plate;

FIG. 8 is an enlarged fragmentary elevational view showing a pivoted supporting portion of a skirt plate device M3;

DETAILED DESCRIPTION OF THE PREFERRED EMBODIMENTS

Figure 1:
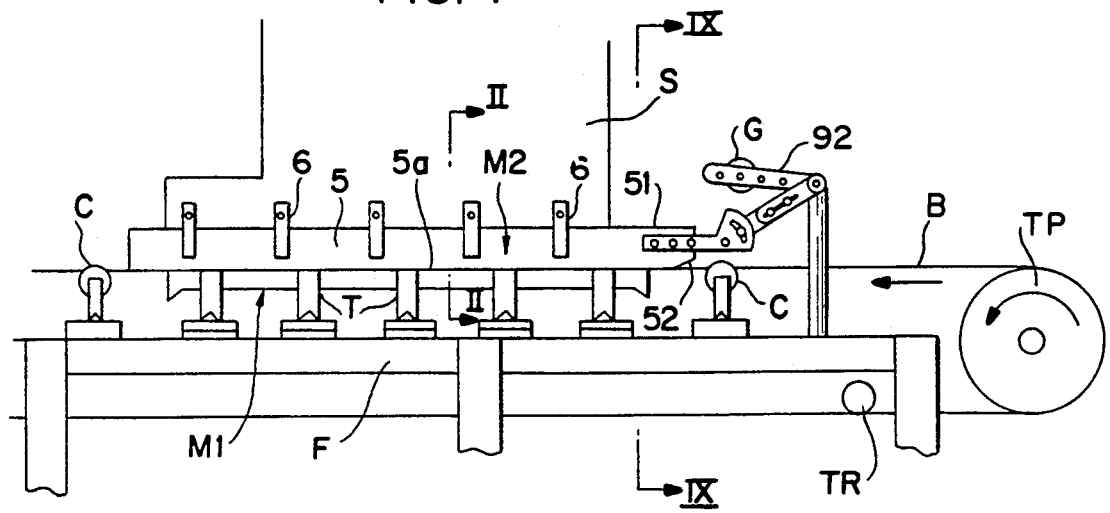
FIG. 1 is a schematic elevational view showing a supporting arrangement for a belt conveyor of one embodiment of the present invention.
Figure 5:
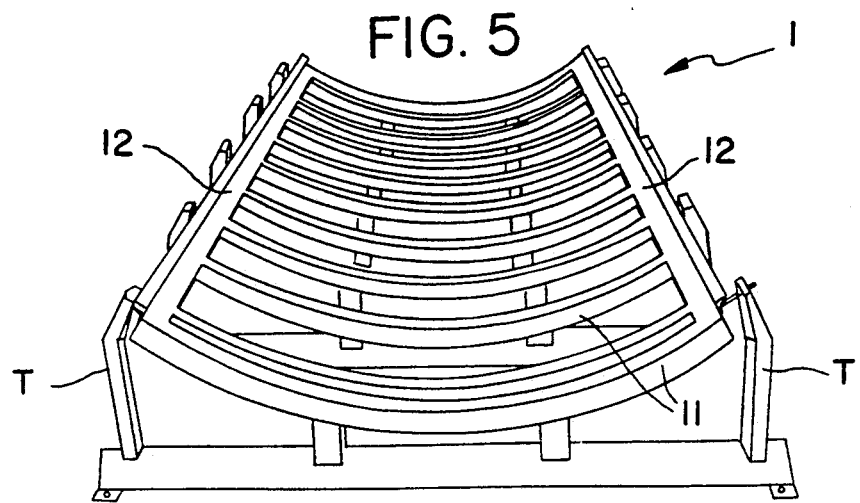
FIG. 5 is a perspective view showing only a frame for supporting the cushioning plate shown in FIG. 4.
Figure 10:
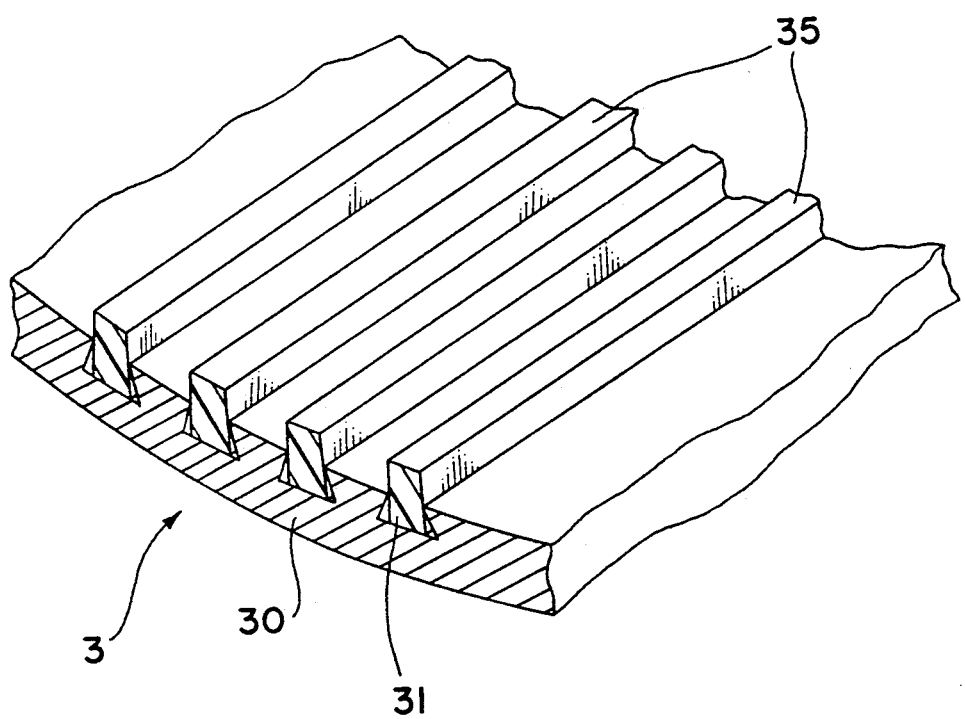
FIG. 10 is a fragmentary perspective view of an alternative embodiment of the top plate.
Figure 11:
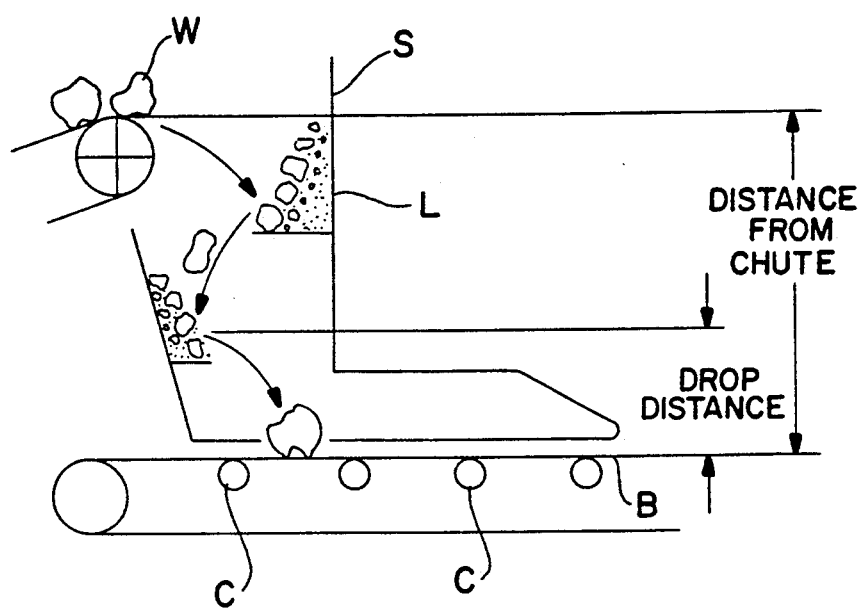
FIG. 11 is an elevational diagrammatic view of the prior art.
Figure 12:
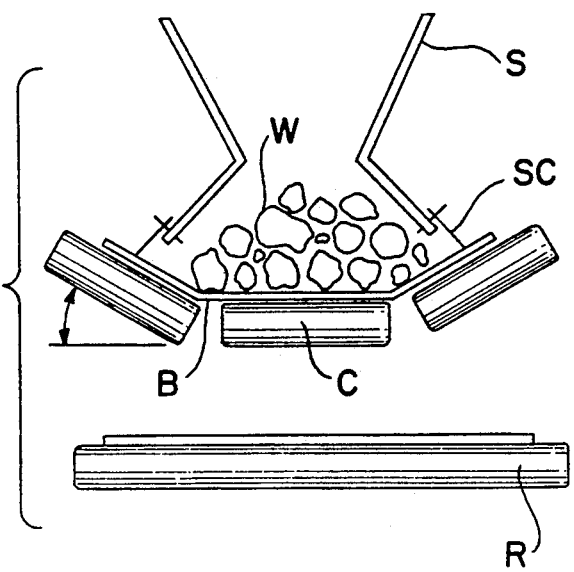
FIG. 12 is a front end view of the prior art.
Figure 13:
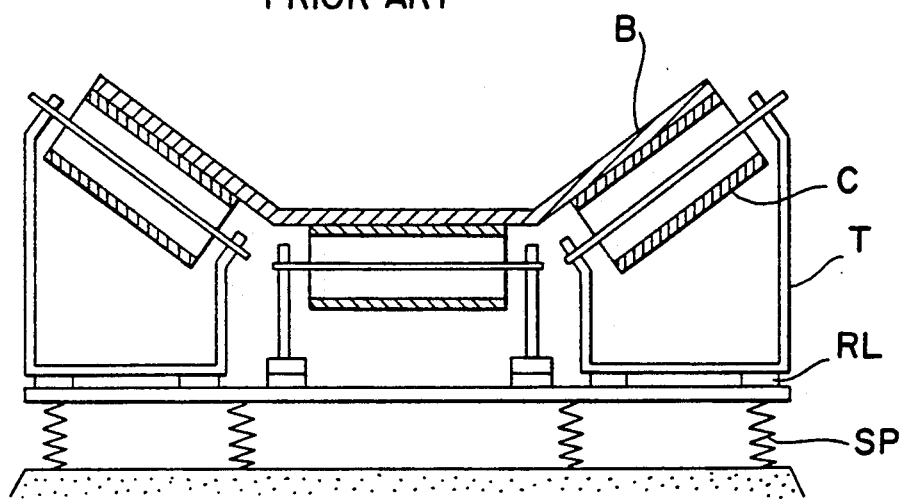
FIG. 13 is a view of the prior supporting arrangement similar to FIG. 2.
Figure 14:
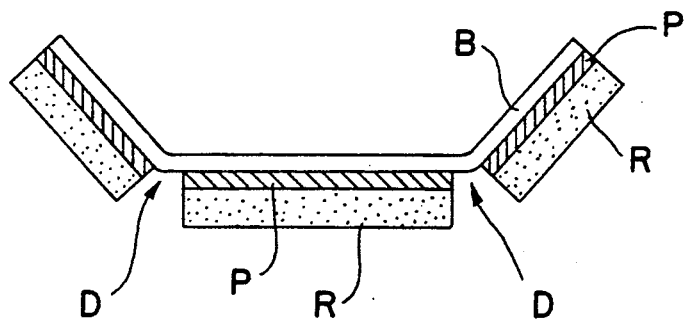
FIG. 14 is a view of the prior alternative supporting arrangement similar to FIG. 2.

In FIG. 1, a belt conveyor arrangement is shown comprised of an endless, arc troughed belt B which is supported in the running direction by means of a tension pulley TP and sustained by means of carrier table T mounted on a conveyor frame F. The belt can run in the arrow direction for conveying bulk material such as ore. On the carrier table T which is positioned where bulk materials is transferred from a chute S, a belt supporting apparatus M1 is mounted. This is comprised of a supporting frame 1 made of steel constructed by plural arc lateral members 11, 11 spaced in a parallel relation connected with both side longitudinal members 12, 12 (FIG. 5) and a cushioning plate 2 mounted along the upper surface of the frame 1, which may be made of a natural or synthetic rubber plate which is designed to a proper thickness, for example about 30 mm, considering the impact load thereonto. Therefore, such a cushioning plate works as a resilient surface support for the belt receiving bulk material, thereby absorbing the dropping energy of bulk material at any position on the belt.

On the above cushioning plate, a contact top plate 3 is mounted. This plate 3 is made of lubricous material provided with plural channels 31 extending in the running direction of the belt and parallel-spaced in a lateral direction thereof. As the lubricous material, it is preferred to use materials having little friction such as heat resisting nylon resin (Brand name: MC-NYLON made by Nihon Polypenco Co., Ltd. in Japan).

The contact plate 3 is preferably designed to have 10-20 mm thickness and channels 31 spaced out at 20-40 mm intervals on the surface thereof which has 5-10 mm depth and 10-20 mm width.

Figure 3:
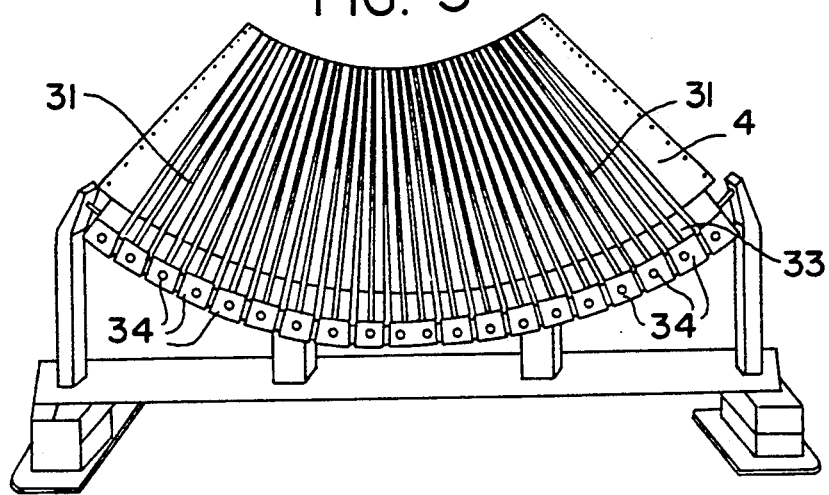
FIG. 3 is a perspective view showing only a rollerless supporting arrangement.
Figure 4:
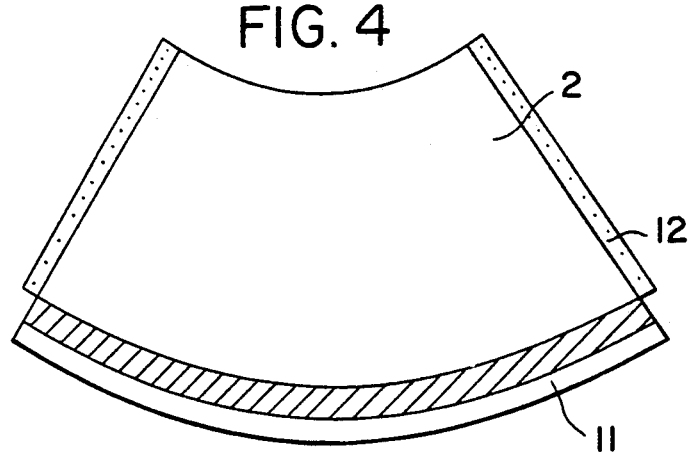
FIG. 4 is a perspective view showing only a top plate mounted on a cushioning plate.

It is necessary to preform the contact top plate 3 into an arc troughed shape. The plural parallel channels make the plate itself easy to deform into the determined shape, as shown in FIG. 3. The deformed plate can thereby bend along the arc troughed surface of the cushioning plate 2.

A method for attaching the contact top plate on the supporting frame 1 can be carried out in the following manner.

Firstly, both side edges 32 of the top plate 3 are cut out along the longitudinal parts thereof, on which cut portions are abutted and fixed detachably by means of flush bolt 42. Pressing members 41' are provided within a corresponding cut portion 41 of the top plate 3 as shown in FIG. 7.

In such a case, it is preferred to attach side longitudinal members 12, of the supporting frame 1 on a carrier table T by means of rubber ring (not shown) for preventing the attaching portion from fatigue failure. On the other hand, as shown in FIG. 6(b), the contact top plate 3 is fixed at the front and back end by plural short pieces 34 which extend downward from inclined parts 33 connected to the belt and contacting the short pieces detachably fixed on front and back arc members 11, 11. Such an arrangement permits the belt contact plate to have some lateral flexibility against belt lateral sliding and also sufficient cushioning function against the shock of dropped bulk material. Additionally, by means of plural parallel channels extending in the longitudinal direction, the belt contact area is decreased by half or two thirds of the total and cooling air flows along the channels accompanied by the belt running thereon, so that the cooling effect is larger than in the case of total contact.

Figure 9:
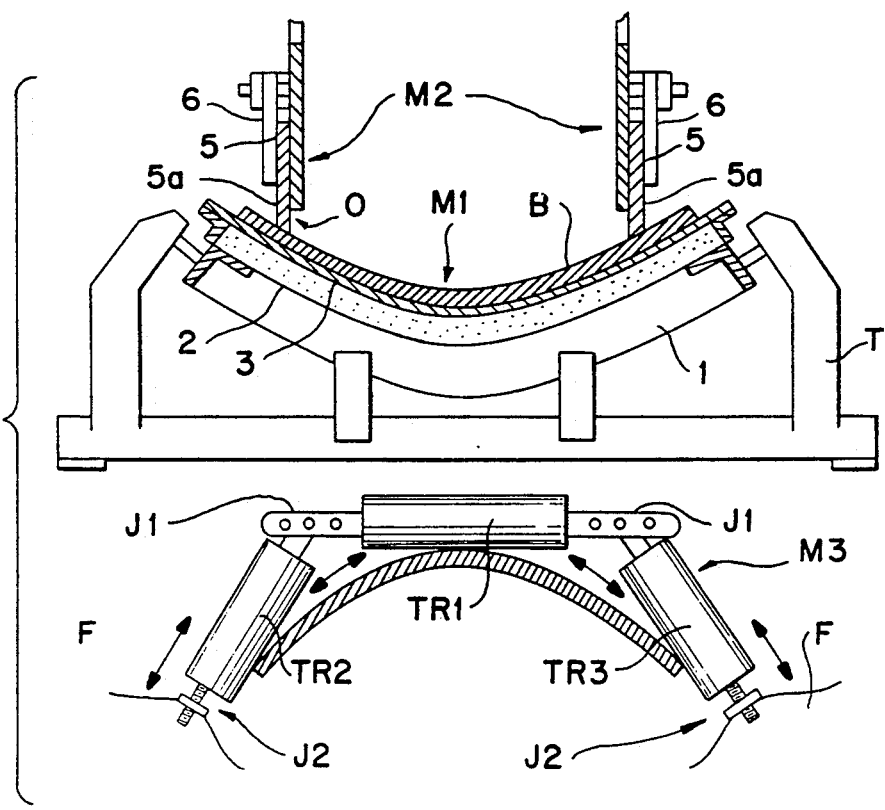
FIG. 9 is a detailed sectional view on line IV—IV of FIG. 1.

As shown in FIGS. 8 and 9, between the chute S and the running belt B supported by the transfer apparatus M1, an opening O extending in the running direction is inevitably formed. This opening O can be closed by means of the skirt plates 5 with little friction, if the weight that presses the plates 5 into contact with the belt surface at the lower edge 5a is adjusted properly.

The skirt plate 5 is slidably arranged between the lower portion of the chute S and adverse L shape members pivoted thereon and spaced from each other in a manner to lower downwardly by its own weight. Also, the skirt plate 5 is supported pivotably at the upstream side by an arm member 8, expandable through an adjuster 83, where the arm member 8 is connected at one end 81 to a fan-shaped projection part 71 of a supporting member 7 in a manner that the connecting angle can be adjusted by means of bolt B1 as well as bolt B2 inserted in an arc cutting hole 72. The other end 82 is connected to a supporting pole 91 and both ends are pivotably supported by a pair of stands 9, 9 spaced out over the belt B positioned behind the transfer apparatus M1. From the supporting pole 91, protruded in a diagonally upward direction, is a supporting member 92, on a selected position of which through plural attaching holes 92a, is attached a balance weight G to adjust the contact pressure against the belt surface. In such an arrangement, the skirt plate 5 automatically lowers and rests on the belt with a predetermined contact pressure at the lower end thereof, this pressure is adjusted by means of attaching the balance weight at a selected position. Further, the skirt plate 5 is cut out at the lower corner of the upstream side thereof to abut smoothly against the belt.

As shown in FIG. 9, at a return side opposite to the transfer position, a tension return roller M3 is arranged for preventing zigzag running of the belt. In this roller apparatus, at both ends of the axis on which a center tension roller TR1 is rotatably mounted, a pair of rotatable right and left rollers TR2, TR3 are pivotably linked. The axes of these rollers TR2, TR3 are arranged to form a pivotably linked return roller system just like the symbol [/\]. As shown in FIG. 9, the site of joint portion J1 can be selected, while the rollers TR2, TR3 are jointed and slidably adjusted along the axis thereof by means of a screw adjuster at the remaining end thereof, so that the cross angles between the rollers TR2, TR3 and the center roller TR1 can be changed by means of adjustment of the joints J1 and J2. Thereby, the portion of the belt at the return side can be corrected to be larger in the curve extent that at the receiving side thereof.

In such an apparatus, the side rollers TR2, TR3 may be linked by a suitable means in place of the above center roller TR1.

As apparent from the above description, according to the above embodiments, the dropping energy of bulk material can be absorbed and thus alleviated by the arrangement for receiving bulk materials comprised of the cushioning device made of elastic material such as rubber which is curvedly arranged in a lateral direction on the supporting frame extending in the running direction of the belt. Further, the contact area between the belt and the top plate is reduced by about half or two thirds, and thus, the friction resistance therebetween is reduced by half compared to that when the belt runs in total contact with the top plate. This reduction is achieved by the top plate having a surface with plural parallel channels extending in the running direction of the belt. Besides, along the plural parallel channels, cooling air flows as the belt runs in contact with the channels. This air flow thereby cools the contact surface thereof. For instance, it has been found that the surface temperature of the belt decreases 5° C. below the ambient temperature in an unloaded condition, i.e. when no bulk material is loaded. It is apparent that the service life of the belt is greatly prolonged compared to a total contact supporting system.

According to the arrangement comprised of the skirt plate device M2 for shutting the opening extending between the chute and the transfer apparatus M2 by means of a low friction material plate which automatically lowers by its own weight, there is no excessive friction and little opening occurs between the skirt plate and the belt. Therefore, the dropping bulk material is prevented from jumping out, even if it jumps on the receiving surface of the belt, so that all the bulk material can be completely conveyed to the determined place.

Furthermore, according to the arrangement comprised of the tension return roller system M3 for correcting a deformable troughed belt, the return side of the running belt is tensed by means of a pair of rollers TR2, TR3 opposite each other and inclined just like the symbol [/\], as well as the belt being adjusted to a determined tension by a pair of tension pulleys, so that the belt can run without zigzag or lateral sliding even if local loading onto the receiving surface of the belt, thereby preventing excessive contact between the belt B and the transfer apparatus M1.

These above functions and effects, such as the cushioning of the impact energy onto the belt, the diminishing of the contact frictional belt, forced cooling of the belt, the closing of the opening between the belt and the chute as well as avoiding the zigzag running of the belt, etc. work together to prevent the belt from 5 being damaged and wearing locally, and thus insure long belt service life.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A supporting arrangement for a conveyor belt movable in a running direction, the arrangement being positioned where bulk materials are transferred from one of a chute and feeder and comprising:

a supporting frame extending in the running direction of the belt, said supporting frame has an arc shape in cross section and said supporting frame extends in the running direction;

a cushioning device mounted on the supporting frame for absorbing impact of bulk materials dropped onto the conveyor belt, said cushioning device comprising a resilient plate mounted on the frame in an arc trough shape generally conforming to the arc shape of the frame; and a backing contact top plate having a lubricated contact surface for smoothly supporting the conveyor belt, said backing plate being mounted on the resilient plate of the cushioning device in an arc trough shape corresponding to the shape of the plate, the contact surface of said backing plate being provided with a plurality of generally parallel channels having sidewalls and a bottom surface, said channels extend in the running direction of the belt, said channels reducing contact area between the belt and the backing plate and upon movement of the belt in the running direction, an air flow is generated in the channels along the running direction of the belt.

2. The supporting arrangement as set forth in claim 1, wherein the backing plate comprises a supporting body provided with a plurality of generally parallel slots extending in a longitudinal direction and lubricous bar members, each of said bar members being fixed in one of the slots, an upper part of the bar members protruding above a top surface of the supporting body and the channels being formed between the bar members.

3. The supporting arrangement as set forth in claim 1, wherein at least the contact surface of the backing plate is made of one of teflon resin and engineering nylon resin.

4. The supporting arrangement as set forth in claim 1, wherein the resilient plate is made of rubber.

5. The supporting arrangement as set forth in claim 3, wherein the engineering nylon resin is MC-nylon.

6. A supporting arrangement for a conveyor belt movable in a running direction, the arrangement being positioned where bulk materials are transferred from one of a chute and feeder comprising:

a supporting frame extending in the running direction of the belt;

a cushioning device mounted on the supporting frame for absorbing impact of bulk materials dropped onto the conveyor belt;

a backing contact top plate mounted on the cushioning device and having a lubricated contact surface for smoothly supporting the conveyor belt; and a skirt plate device for shutting an opening between the conveyor belt and the one of the chute and feeder, the skirt plate device comprising a pair of skirt plates made of lubricous material and which extend in the running direction of the belt and are positioned in a spaced relation at both sides of the belt and pivot means for supporting the pair of skirt plates upstream of the belt to lower in response to their weight to thereby contact the belt with little friction.

7. A supporting arrangement for a conveyor belt movable in a running direction, the arrangement being positioned where bulk materials are transferred from one of a chute and feeder and comprising:

a supporting frame extending in the running direction of the belt;

a cushioning device mounted on the supporting frame for absorbing impact of bulk materials dropped onto the conveyor belt;

a backing contact top plate mounted on the cushioning device and having a lubricated contact surface for smoothly supporting the conveyor belt;

a carrier frame for at least supporting the supporting frame; and a bending tension roller apparatus comprising at least a pair of rollers inclined in directions such that said rollers form an inverted V-shape and a slidable connector for connecting the pair of rollers at one end thereof and each of the rollers being connected at the other end thereof to the carrier frame by slidable connectors, a cross angle between the inclined rollers being adjustable to prevent zigzag running of the belt.

8. The supporting arrangement as set forth in claim 7, further comprising an upper run and a lower run for the belt, the belt conveys the bulk materials by the upper run when the belt moves in the running direction, the upper run of the belt being supported by the backing plate which is mounted on the cushioning device mounted on the supporting frame, the lower run of the belt moving in a direction opposite to the running direction and being in contact with at least the pair of rollers.

9. A supporting arrangement for a conveyor belt movable in a running direction, the arrangement being positioned where bulk materials are transferred from one of a chute and feeder and comprising:

a supporting frame extending in the running direction of the belt, said supporting frame has an arc shape in cross section and said supporting frame extends is the running direction;

a cushioning device mounted on the supporting frame for absorbing impact of bulk materials dropped onto the conveyor belt, said cushioning device comprising a resilient plate mounted on the frame in an arc trough shape generally conforming to the arc shape of the frame; and a backing contact top plate having a lubricated contact surface for smoothly supporting the conveyor belt, said backing plate being mounted on the resilient plate of the cushioning device in an arc trough shape corresponding to the shape of the plate, the contact surface of said backing plate being provided with a plurality of generally parallel channels having sidewalls and a bottom surface, said channels extend in the running direction of the belt, said channels reducing contact area between the belt and the backing plate and upon movement of the belt in the running direction, an air flow is generated in the channels along the running direction of the belt.

said supporting frame being constructed by plural arc lateral members spaced in a generally parallel relation and a pair of longitudinal side members, the arc lateral members being connected with each of the longitudinal side members and the longitudinal side members being attached to a stand.

* * * * *